United States Patent
Chakra et al.

(10) Patent No.: US 10,552,114 B2
(45) Date of Patent: Feb. 4, 2020

(54) AUTO-MUTE REDUNDANT DEVICES IN A CONFERENCE ROOM

(71) Applicant: International Business Machines Corporation, Armonk, NY (US)

(72) Inventors: Al Chakra, Apex, NC (US); Jonathan Dunne, Dungarvan (IE); James P. Galvin, Jr., Georgetown, KY (US); Liam Harpur, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/610,493

(22) Filed: May 31, 2017

(65) Prior Publication Data

US 2018/0349086 A1 Dec. 6, 2018

(51) Int. Cl.
*G06F 3/16* (2006.01)
*H04R 29/00* (2006.01)
(Continued)

(52) U.S. Cl.
CPC ............. *G06F 3/165* (2013.01); *G10L 25/51* (2013.01); *H04W 64/00* (2013.01); *G10L 25/06* (2013.01);
(Continued)

(58) Field of Classification Search
CPC ......... G06F 3/165; G10L 25/51; H04R 3/005; H04R 29/00; H04M 3/568; H04M 2203/303; H04M 2203/2094; H04L 65/403
See application file for complete search history.

(56) References Cited

U.S. PATENT DOCUMENTS 4,658,425 A 4/1987 Julstrom
5,164,729 A 11/1992 Decker et al.
(Continued)

FOREIGN PATENT DOCUMENTS

WO WO2018009209 A1 * 1/2018

OTHER PUBLICATIONS

Terrell, M. et al., "Automatic noise gate settings for drum recordings containing bleed from secondary sources," EURASIP Journal on Advances in Signal Processing, Feb. 1, 2010, vol. 2010, Art. No. 465417, 9 pg.
(Continued)

*Primary Examiner* — Davetta W Goins
*Assistant Examiner* — Kuassi A Ganmavo
(74) *Attorney, Agent, or Firm* — Cuenot, Forsythe & Kim, LLC (57) ABSTRACT

Audio waveform data can be received from a plurality of client devices. The audio waveform data for each client device can be generated by sampling at least one portion of an audio stream received by the respective client device. The audio waveform data received from the plurality of client devices can be compared. Based on the comparison, which of the plurality of client devices are located in a same location can be determined. Further, based on the comparison, which of the plurality of client devices located in the same location are to mute their respective input audio transducers can be determined, and an indicator indicating to the client devices to mute their respective input audio transducers can be communicated to the client devices that are determined to mute their respective input audio transducers.

20 Claims, 4 Drawing Sheets

(51) Int. Cl.
  *H04R 3/00* (2006.01)
  *G10L 25/51* (2013.01)
  *H04W 64/00* (2009.01)
  *H04M 3/56* (2006.01)
  *H04W 52/02* (2009.01)
  *G10L 25/06* (2013.01)

(52) U.S. Cl.
  CPC .... *H04M 3/568* (2013.01); *H04M 2203/2094* (2013.01); *H04M 2203/303* (2013.01); *H04R 3/005* (2013.01); *H04R 29/00* (2013.01); *H04W 52/02* (2013.01)

(56) References Cited

U.S. PATENT DOCUMENTS

| | | | | |
|---|---|---|---|---|
| 5,539,812 | A * | 7/1996 | Kitchin | H04M 1/53 379/189 |
| 5,812,534 | A * | 9/1998 | Davis | H04L 12/6418 370/260 |
| 7,706,553 | B2 | 4/2010 | Brown | |
| 8,218,751 | B2 | 7/2012 | Hepworth et al. | |
| 8,433,050 | B1 * | 4/2013 | Baten | H04L 65/80 375/219 |
| 8,630,208 | B1 * | 1/2014 | Kjeldaas | H04L 12/1822 370/260 |
| 8,903,721 | B1 | 12/2014 | Cowan | |
| 9,473,428 | B1 * | 10/2016 | Koum | H04M 3/02 |
| 10,142,484 | B2 * | 11/2018 | Spittle | H04M 9/082 |
| 2005/0002525 | A1 * | 1/2005 | Alkove | H04L 29/06 380/37 |
| 2005/0213726 | A1 * | 9/2005 | Rodman | H04L 12/66 379/202.01 |
| 2008/0040117 | A1 * | 2/2008 | Yu | H04M 3/56 704/262 |
| 2008/0233934 | A1 * | 9/2008 | Diethorn | H04M 3/56 455/416 |
| 2009/0264114 | A1 * | 10/2009 | Virolainen | H04M 3/56 455/416 |
| 2011/0026763 | A1 * | 2/2011 | Diggins | G10L 25/00 382/100 |
| 2012/0169938 | A1 | 7/2012 | Harvey | |
| 2013/0029649 | A1 | 1/2013 | Hanson et al. | |
| 2014/0003450 | A1 * | 1/2014 | Bentley | H04N 7/15 370/468 |
| 2014/0280879 | A1 * | 9/2014 | Skolicki | H04L 69/28 709/224 |
| 2014/0309998 | A1 | 10/2014 | Basson et al. | |
| 2014/0329511 | A1 * | 11/2014 | Vesa | H04M 3/569 455/416 |
| 2015/0066498 | A1 * | 3/2015 | Ma | G10L 15/28 704/233 |
| 2015/0117626 | A1 * | 4/2015 | Nord | H04M 3/568 379/202.01 |
| 2015/0140978 | A1 * | 5/2015 | Zilmer | H04L 51/36 455/416 |
| 2015/0163362 | A1 * | 6/2015 | Dickins | H04M 3/569 379/202.01 |
| 2015/0222755 | A1 | 8/2015 | Chintala | |
| 2016/0073185 | A1 * | 3/2016 | Kannappan | H04R 3/00 381/150 |
| 2017/0346950 | A1 * | 11/2017 | Shaltiel | H04M 1/6033 |

OTHER PUBLICATIONS

Clifford, A. et al., "Simulating Microphone Bleed and Tom-Tom Resonance in Multisampled Drum Workstations," In Proc. of 15th Int. Conf. on Digital Audio Effects (DAFx-13), Sep. 17-21, 2012, 5 pg.

"Scopia Elite 6000 Series MCU," Administrator Guide, Ver. 8.2, Radvision, an Avaya Company, © 2000-2013 Radvision Ltd., Jul. 11, 2013, <https://support.avaya.com/css/P8/documents/100173463.pdf>, 93 pg.

"Stochastic Process," [online] Wikipedia, the free encyclopedia, May 25, 2017 [retrieved May 31, 2017], retrieved from the Internet: <https://en.wikipedia.org/wiki/Stochastic_process#Stochastic_process>, 37 pg.

"Fast Fourier Transform," [online] Wikipedia, the free encyclopedia, May 29, 2017 [retrieved May 31, 2017], retrieved from the Internet: <https://en.wikipedia.org/wiki/Fast_Fourier_transform>, 14 pg.

"Autocorrelation," [online] Wikipedia, the free encyclopedia, May 4, 2017 [retrieved May 31, 2017], retrieved from the Internet: <https://en.wikipedia.org/wiki/Autocorrelation>, 10 pg.

"System and Method for Location Based QoS in Unified Telephony," [online] IP.com Prior Art Database, Technical Disclosure No. IPCOM000222398D, Oct. 1, 2012, retrieved from the Internet: <http://ip.com/IPCOM/000222398D>, 3 pg.

"Method to reduce interruptions during conference calls", [online] IP.com Prior Art Database, Technical Disclosure No. IPCOM000212302D, Nov. 4, 2011, retrieved from the Internet: <http://ip.com/IPCOM/000212302D>, 4 pg.

"Managing multiple audio streams in a single room," [online] IP.com Prior Art Database, Technical Disclosure No. IPCOM000212643D, Nov. 21, 2011, retrieved from the Internet: <http://ip.com/IPCOM/000212643D>, 4 pg.

* cited by examiner

```
┌─────────────────────────────────────────────────────────────────┐
│  Receive from a plurality of client devices an audio waveform   │
│  data, wherein the audio waveform data for each client device   │
│  is generated by sampling at least one portion of an audio      │
│  stream received by the respective client device                │
│                              505                                │
└─────────────────────────────────────────────────────────────────┘
                                │
                                ▼
┌─────────────────────────────────────────────────────────────────┐
│   Compare audio waveform data received from the plurality of    │
│                         client devices                          │
│                              510                                │
└─────────────────────────────────────────────────────────────────┘
                                │
                                ▼
┌─────────────────────────────────────────────────────────────────┐
│  Based on the comparing audio waveform data received from the   │
│  plurality of client devices, determine which of the plurality  │
│  of client devices are located in a same location, determine    │
│  which of the plurality of client devices located in the same   │
│  location are to mute their respective input audio transducers, │
│  and communicate to those client devices a first indicator      │
│  indicating to the client devices to mute their respective      │
│  input audio transducers                                        │
│                              515                                │
└─────────────────────────────────────────────────────────────────┘
                                │
                                ▼
┌─────────────────────────────────────────────────────────────────┐
│  Based on the comparing audio waveform data received from the   │
│  plurality of client devices, determine which of the plurality  │
│  of client devices located in the same location are to mute     │
│  their output audio transducers, and communicating to those     │
│  client devices a second indicator indicating to the client     │
│  devices to mute their respective output audio transducers      │
│                              520                                │
└─────────────────────────────────────────────────────────────────┘
```

FIG. 5

AUTO-MUTE REDUNDANT DEVICES IN A CONFERENCE ROOM

BACKGROUND

The present invention relates to conferencing systems and, more particularly, systems that electronically host conferences.

An electronically hosted conference is the live exchange of information among a plurality of persons using conferencing devices, wherein at least two of the persons are located remotely with respect to one another, but their client devices are communicatively linked by a communication network. Electronically hosted conferences typically involve the sharing of audio information, although also may involve sharing of media content, such as slides/images, multimedia, etc.

SUMMARY

A method includes receiving from a plurality of client devices an audio waveform data, wherein the audio waveform data for each client device is generated by sampling at least one portion of an audio stream received by the respective client device. The method also can include comparing audio waveform data received from the plurality of client devices. The method also can include, based on the comparing audio waveform data received from the plurality of client devices, determining which of the plurality of client devices are located in a same location, determining, using a processor, which of the plurality of client devices located in the same location are to mute their respective input audio transducers, and communicating to those client devices a first indicator indicating to the client devices to mute their respective input audio transducers.

A system includes a processor programmed to initiate executable operations. The executable operations include receiving from a plurality of client devices an audio waveform data, wherein the audio waveform data for each client device is generated by sampling at least one portion of an audio stream received by the respective client device. The executable operations also can include comparing audio waveform data received from the plurality of client devices. The executable operations also can include, based on the comparing audio waveform data received from the plurality of client devices, determining which of the plurality of client devices are located in a same location, determining which of the plurality of client devices located in the same location are to mute their respective input audio transducers, and communicating to those client devices a first indicator indicating to the client devices to mute their respective input audio transducers.

A computer program includes a computer readable storage medium having program code stored thereon. The program code is executable by a processor to perform a method. The method includes receiving, by the processor, from a plurality of client devices an audio waveform data, wherein the audio waveform data for each client device is generated by sampling at least one portion of an audio stream received by the respective client device. The method also can include comparing, by the processor, audio waveform data received from the plurality of client devices. The method also can include, based on the comparing audio waveform data received from the plurality of client devices, determining, by the processor, which of the plurality of client devices are located in a same location, determining, by the processor, which of the plurality of client devices located in the same location are to mute their respective input audio transducers, and communicating, by the processor, to those client devices a first indicator indicating to the client devices to mute their respective input audio transducers.

DETAILED DESCRIPTION

This disclosure relates to conferencing systems and, more particularly, systems that electronically host conferences. In accordance with the inventive arrangements disclosed herein, audio waveform data can be received from a plurality of client devices. The audio waveform data can be distinct from audio data received from the plurality of client devices. For example, the audio waveform data can be generated by sampling an analog audio signal at a lower sampling rate used to generate audio data from the audio signal. The audio waveform data received from the plurality of client devices can be compared. Based on the comparison, which of the plurality of client devices are located in a same location can be determined. Further, based on the comparison, which of the plurality of client devices located in the same location are to mute their respective input audio transducers can be determined. An indicator can be communicated to the determined client devices. The indicator can indicate to those client devices to mute their respective input audio transducers.

When the respective input audio transducers are muted, the respective client devices can cease generating audio data 150 from input audio signals detected by the input audio transducers, but audio waveform data still can continue to be generated. The audio waveform data can indicate characteristics of the input audio signals, but need not include data representing the frequency range of the input audio signals to the extent represented in the audio data. Thus, when the input audio transducers are muted, the bandwidth used for communications by the client devices is reduced in comparison to having each of the client devices continue to communicate the audio data. Moreover, by muting the input audio transducers in this manner, merged audio data generated in a conference will be clearer in comparison to leaving all of the input audio transducers unmuted.

For example, if a person's speech is detected by numerous input audio transducers at a particular location, and the respective client devices each communicate audio data that is merged into audio data for the conference, time delays from the respective audio data and background noises can tend to garble the resulting merged audio data. The present arrangements mitigate such issues.

Further, in accordance with the inventive arrangements disclosed herein, output audio transducers of certain client devices also can be muted. Thus, rather than having all client devices generate output audio signals, the number of output audio transducers generating audio signals can be limited to a subset of the output audio transducers present in the location. In one aspect, all but one output audio transducer can be muted. When a significant number of client devices are generating output audio via respective output audio transducers, the specific timing of the generated output audio signals can vary due to various latencies, including latencies in a network, latencies in the client devices themselves, and latencies in a conferencing server communicating data packets containing audio data to the various client devices. The variances in timing can result in output audio signals generated by various output audio transducers interfering with one another and garbling the output audio signals. The present arrangements can address this issue by limiting the number of output audio transducers that are used to output the audio signals. Further, the present arrangements also can implement time correction processes to time align the output audio signals generated by output audio transducers that are unmuted. This can serve to mitigate distortions in the output audio signals caused by time delays.

Several definitions that apply throughout this document now will be presented.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "client device" means a processing system including at least one processor and memory that requests shared services from a server, and with which a user directly interacts. Examples of a client device include, but are not limited to, a voice over IP (VoIP) telephone, a smart phone, a computer (e.g., a desktop computer, a laptop computer, a notebook computer, a tablet computer, etc.), a smart watch, smart glasses, a gaming device, and the like. Network infrastructure, such as servers, routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
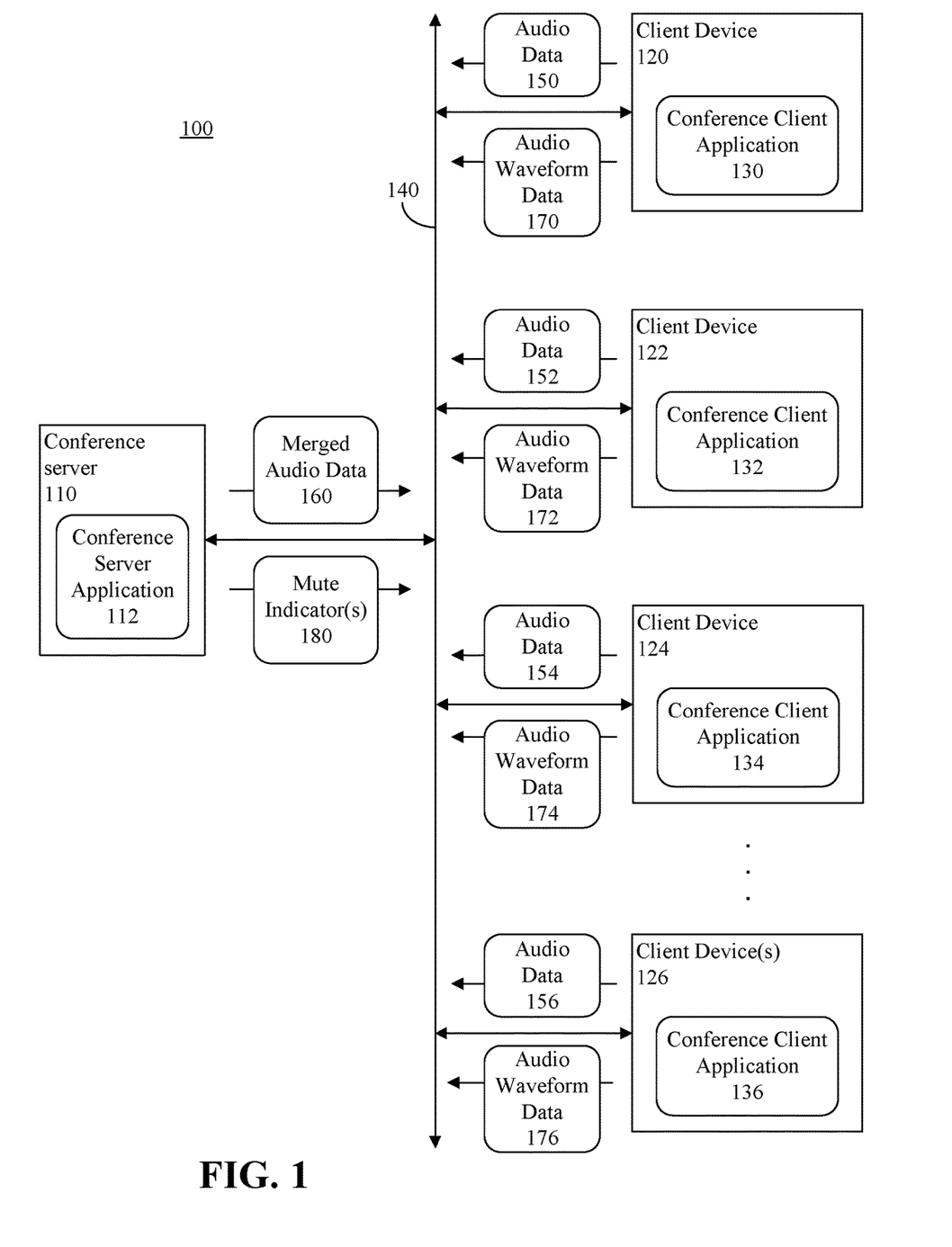
FIG. 1 is a block diagram illustrating an example of an electronic conferencing environment.

FIG. 1 is a block diagram illustrating an example of an electronic conferencing environment 100. The electronic conferencing environment 100 can include a conference server 110. The conference server 110 can include at least one processor and memory, and can include a conference server application 112 stored in the memory and executable by the processor(s). The conference server application 112 can be configured to perform various processes described herein as being performed by the conference the conference server 110.

The electronic conferencing environment 100 also can include a plurality of client devices 120, 122, 124, 126. Each client device 120, 122, 124, 126 can include at least one processor and memory, and can include a respective conference client application 130, 132, 134, 136 stored in the respective memory and executable by the respective processor(s). The conference client applications 130-136 can be configured to perform various processes described herein as being performed by the respective client devices 120-126.

The client devices 120-126 can be communicatively linked to the conference server 110 via at least one communication network 140. The communication network 140 is the medium used to provide communications links between various devices and data processing systems connected together within electronic conferencing environment 100. The communication network 140 may include connections, such as wire, wireless communication links, or fiber optic cables. The communication network 140 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

In operation, for example during an electronically hosted conference, the client devices 120-126 need not be all located in a same location. For example, the client devices 120-122 can be located in a first conference room within a first facility (e.g., physical structure), the client devices 124-126 can be located in a second conference room within the first facility or within a second facility, other client device(s) can be located in one or more other conference rooms in the first facility, second facility, or one or more other facilities, and so on. Moreover, the first facility, the second facility and/or the other facilities can be geographically dispersed from one another, for example as different buildings at a particular geographic location, or as buildings in different geographic locations. In this regard, the first facility can be located in a different geographic region than the second facility and/or other facilities, for example in a different village, city, state, or country.

In one arrangement, conference client application 130, 132, 134, 136 can be configured to, prior to or during the electronically hosted conference, communicate to the conference server application 112 location data indicating the present location of the respective client devices 120-126. The location data can be, for example, global positioning system (GPS) coordinates. In this regard, each client device 120-126 can include a GPS receiver. Based on the location data, the conference server application 112 can determine which client devices 120-126 are located at the same locations. In another arrangement, which will be described, the conference server application 112 can determine which client devices 120-126 are co-located at the same locations based on audio waveform data received from the client devices 120-126.

Each conference client application 130, 132, 134, 136 can be configured to, during the electronically hosted conference, generate respective audio data 150, 152, 154, 156, and communicate the respective audio data 150-156 to the conference server application 112 via the communication network(s) 140. The conference client applications 130-136 can generate the audio data 150-156, in real time, by performing analog-to-digital (A/D) conversion on audio signals detected by respective input audio transducers (e.g., microphones). The input audio transducers can be components of the respective client devices 120, 122, 124, 126, or communicatively linked to the respective client devices 120, 122, 124, 126 in a suitable manner, for example via communication ports of the respective client devices 120, 122, 124, 126.

The audio data 150-156 can include, in a digital format, a representation of audible frequencies detected by the input audio transducers, for example in a frequency range up to 3 kHz, 4 kHz, 5 kHz, or higher. To generate the audio data 150-156, each conference client application 130 can sample the audio signals detected by the respective input audio transducers. The sampling rate can be greater than a threshold level of sampling rate required to reproduce, from the audio data 150-156, human understandable audio signals representing the detected audio signals. In illustration, based on the Nyquist Theorem, the sampling rate can be approximately twice the desired upper limit of the frequency range. For example, a sampling rate of 6 kHz can be used to generate a digital representation of audio signals up to 3 kHz, a sampling rate of 8 kHz can be used to generate a digital representation of audio signals up to 4 kHz and so on.

In one arrangement, each conference client application 130-136 can implement echo cancelation to cancel audio signals generated by output audio transducers of, or communicatively linked to, the respective client devices 120-126 from being captured in the audio data 150-156. Echo cancelation is well known in the art. Further, low pass filtering can be implemented to limit an amount of low frequency data in the audio data 150-156, for example, to limit the audio data 150-156 to frequencies between 50 Hz and 3 kHz, 50 Hz and 4 kHz, 50 Hz and 5 kHz, and so on. Further, each conference client application 130-136 can digitally compress the respective audio data 150-156 using known compression techniques to minimize the amount of bandwidth used to communicate the audio data 150-156 to the conference server 110.

During the electronically hosted conference, the conference server application 112 can merge, in real time, at least a portion of the respective audio data 150-166 into merged audio data 160, and communicate the merged audio data 160 to the client devices 120-126 for presentation via respective output audio transducers. When merging the respective audio data 150-156, the conference server application 112 can exclude from the merged audio data 160 audio data 150-156 from muted client devices 120-126, as will be described.

Each conference client application 130-136 can be configured to, during the electronically hosted conference, also generate respective audio waveform data 170, 172, 174, 176, in real time, based on the audio signals detected by the respective input audio transducers, and communicate the respective audio waveform data 170-176 to the conference server application 112 via the communication network(s) 140. As noted, each conference client application 130-136 can implement echo cancelation to cancel audio signals generated by output audio transducers of, or communicatively linked to, the respective client devices 120-126 from being captured in the audio waveform data 170-176.

The audio waveform data 170-176 can be a representation of the audio signals detected by respective input audio transducers after echo cancelation has been applied to the audio signals. For example, each audio waveform data 170-176 can be a digital representation of the respective audio signals generated using an A/D conversion process of the respective conference client applications 130-136. The digital representations can be generated based on sampling the respective audio signals, but at a sampling rate that is lower than the sampling rate used to generate the audio data 150-156. In this regard, the complete audio waveforms need not be sampled to generate the digital representations contained in the audio waveform data 170-176.

In illustration, the digital representations can be sampled using a sampling rate below a threshold level of sampling rate. Moreover, the sampling rate can be performed at a level that is less than a threshold level of sampling rate required to reproduce, from the audio waveform data 170-176, human understandable audio signals representing the detected audio signals. As will be described, the conference server application 112 need only be able to identify certain distinguishing features between various audio waveform data 170-176, but such distinguishing features need not be based on a significant portion of the entire audio spectrum of the detected audio signals.

In illustration, the sampling rate can be less than 2 kHz, 1.5 kHz, 1 kHz, 900 Hz, 800 Hz, 700 Hz, 600 Hz, 500 Hz, 400 Hz, 300 Hz, 200 Hz, 100 Hz, 50 Hz and so on. Moreover, the sampled data can be compressed using one or more audio compression techniques known in the art. By limiting the sampling rate and implementing audio compression to generate the audio waveform data 170-176, the present arrangements can ensure that a level of bandwidth of the communication network(s) 140 used to communicate the respective audio waveform data 170-176 is minimized, for example below a threshold level. Thus, relatively fewer data packets can be required to communicate the audio waveform data 170-176 in comparison to arrangements in which a greater sampling rate is used to sample the audio signals. Accordingly, risk that communication of the audio waveform data 170-176 from the client devices 120-126 to the conference server 110 using enough bandwidth to cause significant latencies and/or other communication issues in the communication network 140 is mitigated. This can improve performance of the electronic conferencing environment 100 in comparison to arrangements in which a greater sampling rate is used to sample the audio signals. In one arrangement, the sampling rate used to generate the audio waveform data 170-176 can be dynamically variable, as will be described.

The conference server application 112 can process the audio waveform data 170-176 received from the respective client devices 120-126 in real time. Such processing can include comparing the respective audio waveform data 170-176. In one arrangement, based on comparing the respective audio waveform data 170-176, the conference server application 112 can determine which of the plurality of client devices 120-126 are located in a same location, for example in a same room. In illustration, the conference server application 112 can process the audio waveform data 170-176 to identify similarities among two or more of audio waveform data 170-176. Such similarities can indicate that two or more of the client devices 120-126 are located close enough to one another to detect the same audio signals.

Figure 2:
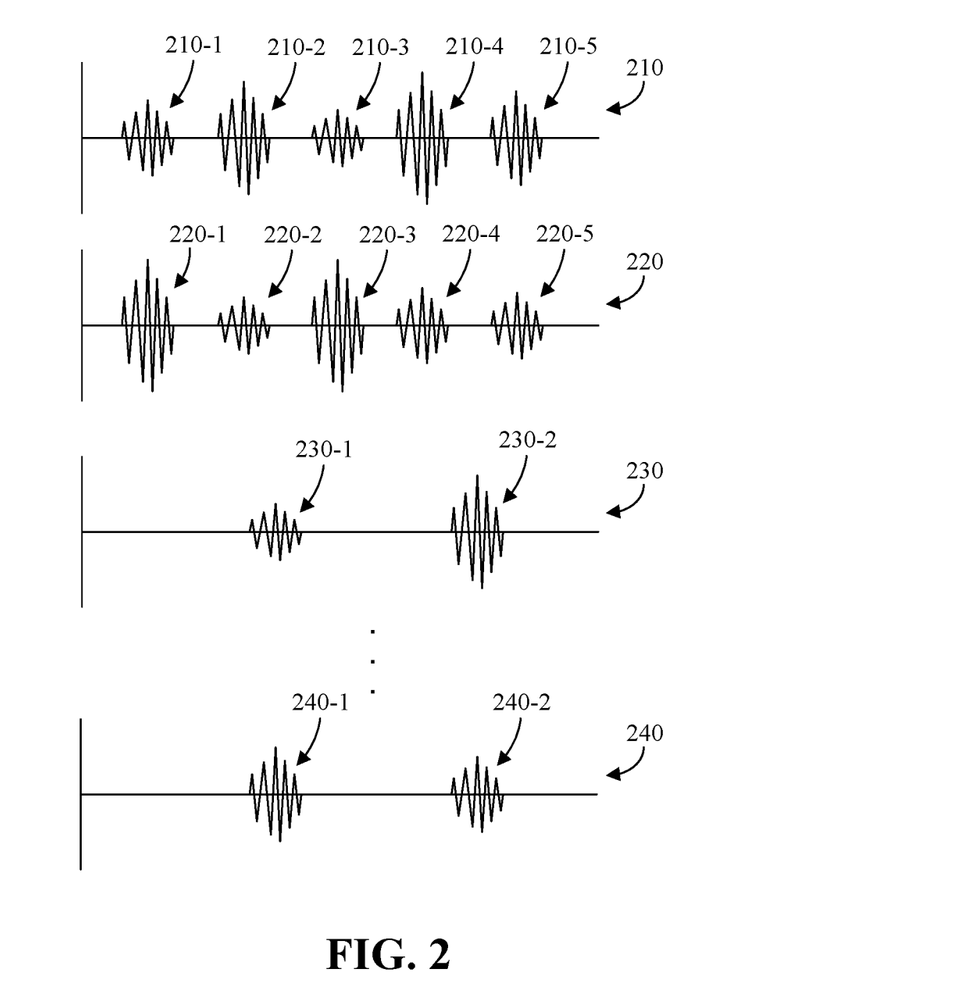
FIG. 2 depicts a plurality of example audio waveforms represented by respective audio waveform data.

FIG. 2 depicts a plurality of example audio waveforms 210, 220, 230, 240 represented by respective audio waveform data 170, 172, 174, 176 (FIG. 1). In this regard, the audio waveforms 210-250 can be waveforms of the audio signals as received by the input audio transducers of the respective client devices 120-126, for example after echo cancelation has been applied. The conference server application 112 can compare the waveforms 210-240 in a manner that compensates for time delays that may occur due to latencies in the electronic conferencing environment 100.

In this example, assume that the client devices 120, 122 are located in the same room, such as a conference room. Also, assume that the client devices 124, 126 are both located in another room, for instance a conference room at another geographic location. Because the client devices 120, 122 are located in the same room, the input audio transducers of the client devices 120, 122 can detect the same audio signals, though the amplitudes of the audio signals, as detected, may vary among the client devices 120, 122 depending on a distance of the respective input audio transducers from the source(s) of the audio signals (e.g., a person who is speaking). Similarly, because the client devices 124, 126 are located in the same room, the input audio transducers of the client devices 124, 126 can detect the same audio signals, though the amplitudes of the audio signals, as detected, also may vary among the client devices 124, 126.

As noted, the conference server application 112 can identify similarities in the audio waveform data 170-176 to determine which, if any, client devices 120-126 are co-located in a same geographic location (e.g., in a same room). In illustration, the conference server application 112 can determine that the waveforms 210-1, 220-1 represent the same audio signals (though at different amplitudes), the waveforms 210-2, 220-2 represent the same audio signals, the waveforms 210-3, 220-3 represent the same audio signals, the waveforms 210-4, 220-4 represent the same audio signals, and the waveforms 210-2, 220-2 represent the same audio signals. Similarly, the conference server application 112 can determine that the waveforms 230-1, 240-1 represent the same audio signals (though at different amplitudes), and the waveforms 230-2, 240-2 represent the same audio signals, but those audio signals are not the same as the audio signals 210-220. Based on such determinations, the conference server application 112 can determine that the client devices 120, 122 are co-located in the same location, and that the client devices 124, 126 are co-located in another location.

By way of example, the conference server application 112 can split each audio waveform data 170-176 into segments of a particular size. For example, the conference server application 112 can split each audio waveform data 170-176 into segments that are 1 s each, or any other desired size. In one arrangement, the audio waveform data 170-176 can include time stamps that can be processed by the conference server application 112 to determine when audio signals are received by the respective client devices 120-126. The conference server application 112 can process the time stamps to determine a starting time for each segment of the respective audio waveform data 170-176. In illustration, the conference server application 112 can identify, in each of the respective audio waveform data 170-176, audio waveform data beginning at 12:40:01:00 and ending at 12:40:02:00 and that waveform data as a first segment. Further, the conference server application 112 can identify, in each of the respective audio waveform data 170-176, audio waveform data beginning at 12:40:02:00 and ending at 12:40:03:00 and that waveform data as a second segment, and so on. Accordingly, the conference server application 112 can ensure that corresponding segments determined for the respective audio waveform data 170-176 correspond to the same detected audio signals. The conference server application 112 can, in real time as each corresponding segment is identified in the respective audio waveform data 170-176, determine a level of correlation between the respective segments (i.e., determine a level of correlation between each of the first segments, a level of correlation between each of the second segments, and so on). If the level of correlation between respective segments is equal to or above a correlation threshold value, the segments can be determined to correlate to one another. If the level of correlation is below the correlation threshold value, the segments can be determined as not correlating to one another.

In illustration, the conference server application 112 can perform a Fast Fourier Transform (FFT) on each segment to generate a discrete Fourier transform (DFT) of each segment. The conference server application 112 can, in real time, compare the DFT generated from corresponding segments of the audio waveform data 170-176 by calculating a correlation between the respective DFTs. In illustration, the conference server application 112 can calculate a level of correlation between the DFT of a first segment of the audio waveform data 170 and the DFT of a first segment of the audio waveform data 172, calculate a level of correlation between the DFT of a first segment of the audio waveform data 170 and the DFT of a first segment of the audio waveform data 174, calculate a level of correlation between the DFT of a first segment of the audio waveform data 170 and the DFT of a first segment of the audio waveform data 176, and so on. The conference server application 112 can continue to process until each first segment in the respective audio waveform data 170-076 have been compared to one another. In response to identifying a second segment in each of the respective audio waveform data 170-176, the conference server application 112 can repeat the above process on the second segments until each second segment in the respective audio waveform data 170-076 have been compared to one another. The process can repeat for each additional set of segments while the audio waveform data 170-176 continues to be received.

The level of correlation between compared segments can be determined using auto correlation, which is known in the art. Performing the auto correlation can include, for example, comparing stochastic processes representing the respective DFTs. As is known in the art, a stochastic process is a collection of random variables defined in a common probability space ($\Omega$, F, P), where $\Omega$ is a sample space (e.g., a DFT), F is a $\sigma$-algebra, and P is a probability measure, and the random variables, indexed by some set T, all take values in the same mathematical space S, which can be measurable with respect to some $\sigma$-algebra $\Sigma$. In other words, for a given probability space ($\Omega$, F, P), and a measurable space (S, $\Sigma$), a stochastic process can be a collection of S-valued random variables, which can be indicated as $\{X(t):t\in T\}$. The conference server application 112 can determine the level of correlation between each pair of segments by determining a level of correlation of the S-valued random variables generated for the DFTs generated for those segments. The level of correlation can be a value between 0 and 1 (or 0% and 100%), where 0 indicates no correlation whatsoever and 1 indicates complete correlation. In this example, the correlation threshold value can be 0.8 (80%), 0.85 (85%), 0.90 (90%), 0.95 (95%), or any other desired value. The higher the correlation threshold value that is used, the higher the level of correlation between the segments will be in order for the segments to be deemed to correlate to one another.

As noted, the audio signals may be sampled at a low rate to generate the audio waveform data 170-176 in order to conserver communication network resources. Thus, the audio waveform data 170-176 may include only a portion of the audio frequencies contained in the received audio signals which, based on the Nyquist Theorem, is approximately one-half of the sampling rate. For example, if the audio signals are sampled at a 1 kHz sampling rate, the audio waveform data 170-176 may represent frequencies from 0 to 500 Hz that are contained in the audio signals. Nonetheless, such a frequency range may be sufficient to perform accurate comparisons of the audio waveform data 170-176. As noted, the sampling rate can be higher, or even lower, than 1 kHz. In an arrangement in which two or more of audio waveform data 170-176 are generated using different sampling rates, the conference server application 112 can filter the audio waveform data 170-176 to exclude frequencies higher than a threshold frequency for the comparison. The threshold frequency can be, for example, a frequency that is on-half of the lowest sampling rate used among the respective conference client applications 130-136.

Referring again to FIG. 1, based on comparing the respective audio waveform data 170-176, the conference server application 112 can determine, in real time, which of the plurality of client devices 120-126 located in the same location are to mute their input audio transducers with respect to generating the audio data 150-156. To make such determination, the conference server application 112 can identify, based on the audio waveform data 170-176, which client device 120-126 at each location is generating the best audio data 150-156.

In illustration, the conference server application 112 can process each of the audio waveform data 170-176 and generate one or more audio quality parameters based on such processing. One example of an audio quality parameter is an amplitude parameter indicating an amplitude (e.g., an average amplitude) of the sampled audio signals. Another example of an audio quality parameter is a noise parameter indicating a level of noise contained in the sampled audio signals. The noise parameter can indicate, for example, a signal-to-noise ratio (SNR). Still, other types of audio quality parameters can be generated and the present arrangements are not limited in this regard. The conference server application 112 can compare the audio quality parameters assigned to audio waveform data 170-176 generated by client devices 120-126 that are determined to be in the same location. Based on such comparison, the conference server application 112 can determine which client device 120-126 at that location is generating, or will generate, the best audio data 150-156.

By way of example, assume the conference server application 112 has determined that the client devices 120, 122 both are located at a first location (e.g., in a first room). Also, assume that the audio quality parameters assigned to the audio waveform data 170 indicate a greater amplitude and less noise (e.g., a highest SNR) in comparison to the audio quality parameters assigned to the audio waveform data 172. Such circumstance can indicate that the audio waveform data 170 is higher quality than the audio waveform data 172. Since the audio waveform data 170 is generated based on the same input audio signals used to generate the audio data 150, and the audio waveform data 172 is generated based on the same input audio signals used to generate the audio data 152, the conference server application 112 can assume that the audio data 150 is higher quality than the audio data 152, and thus the client device 120 is generating the best audio data 150 from among the client devices 120, 122 at the location. If the conference server application 112 has determined that the client devices 124, 126 both are located at a second location (e.g., in a second room), the conference server application 112 can perform similar processes to determine which of the client devices 124, 126 are generating the best audio data 154, 156 based on the audio waveform data 174, 176. For the following example, assume the conference server application 112 determines the audio data 154 is higher quality than the audio data 156, and thus the client device 124 is generating the best audio data 154 for the second location.

Responsive to determining that the client devices 120, 124 are generating the best audio data 150, 154, the conference server application 112 can initiate, in real time, the client devices 122, 126 to mute their respective input audio transducers with respect to generating the audio data 152, 156. For example, the conference server application 112 can communicate to the client devices 122, 126 (e.g., to the respective conference client applications 132, 136) a respective mute indicator 180. Responsive to receiving the mute indicator 180, the client devices 122, 126 can mute their respective input audio transducers with respect to generating the audio data 152, 156. In this regard, when muting the input audio transducers, the respective client devices 122, 126 can continue to receive audio signals from their respective input audio transducers, but cease communicating the audio data 152, 156 when the respective input audio transducers are muted. For example, the client devices 122, 126 can cease communicating the audio data 152, 156 for a threshold period of time, or cease communicating audio data 152, 156 until the conference server application 112 initiates the client devices 122, 126 to unmute their respective input audio transducers.

Even as the input audio transducers of the client devices 122, 126 are muted with respect to the audio data 152, 156, the client devices 122, 126 can continue to generate and communicate the audio waveform data 172, 176. Accordingly, the conference server application 112 can continue comparing the audio waveform data 170-176 and generating audio quality parameters for the respective audio waveform data 170-176. If at some time the conference server application 112 determines that the audio quality parameters generated based on the audio waveform data 172 indicate higher quality than the audio quality parameters generated based on the audio waveform data 170, the conference server application 112 can, in real time, initiate the client device 122 to unmute its input audio transducer with respect to generating the audio data 152, and initiate the client device 122 to mute its input audio transducer with respect to generating the audio data 150. Similarly, if the conference server application 112 determines that the audio quality parameters generated based on the audio waveform data 176 indicate higher quality than the audio quality parameters generated based on the audio waveform data 174, the conference server application 112 can initiate, in real time, the client device 126 to unmute its input audio transducer with respect to generating the audio data 156, and initiate the client device 124 to mute its input audio transducer with respect to generating the audio data 154.

The conference server application 112 can initiate the respective client devices 120-126 to mute and unmute their respective input audio transducers with respect to generating the audio data 150-154 in any suitable manner. In one non-limiting arrangement, the conference server application 112 can include mute indicators 180 in respective data streams communicated to the client devices 120-126, for example data streams communicating the merged audio data 160. By way of example, the mute indicators 180 can be implemented as muting flags set within audio data packets, for example transmission control protocol (TCP) data packets carrying the audio data streams. For instance, the conference server application 112 can implement the muting flags as flags contained within headers of the TCP packets. Each muting flag can be set to mute (e.g., set to 1) or set to unmute (e.g., set to 0). Each conference client application 130 can be configured to process the muting flags contained in the data stream it receives, and mute/unmute the input audio transducer accordingly. For example, if the client device 122 receives a TCP packet with the mute flag set to mute, the client device can mute its input audio transducer (if it is not already muted). If the client device receives a TCP packet with the mute flag set to unmute, the client device can unmute its input audio transducer (if it is not already unmuted).

In another arrangement, the conference server application 112 can communicate to the client devices 120-126, which are to mute their respective input audio transducers, messages including the mute indicators 180. The messages can be, for example, request messages. The respective conference client applications 130-136 can mute and unmute their respective input audio transducers in accordance with the mute indicators 180 they receive. In illustration, if the conference server application 112 determines that the client device 122 is to mute its input audio transducer, the conference server application 112 can communicate to the client device a message having a mute indicator 180 set to mute. In response to receiving such message, the client device 122 can mute its input audio transducer. If the conference server application 112 determines that the client device 122 is to unmute its input audio transducer, the conference server application 112 can communicate to the client device a message having a mute indicator 180 set to unmute. In response to receiving such message, the client device 122 can unmute its input audio transducer.

In one aspect of the present arrangements, the conference server application 112 can assign to each mute indicator 180 a time stamp. The time stamp can indicate when a client device 120-126 receiving the mute indicator 180 is to mute/unmute it input audio transducer. In illustration, a mute indicator 180 communicated to the client device 120 to indicate to the client device 120 to mute its input audio transducer can have the same time stamp as a mute indicator 180 communicated to the client device 122 to indicate to the client device 122 to unmute its input audio transducer. Each client device 120, 122 can mute/unmute its respective input audio transducer at the precise time indicated by the time stamp. Accordingly, gaps in receiving audio data 150, 152 can be mitigated, while also mitigating risk of overlapping audio data 150, 152. The time stamps can be communicated in a TCP packet header with the mute flag or communicated in the previously described message.

During operation, the conference server application 112 can ensure that at least one input audio transducer at each location is unmuted, and thus at least one audio data 150-156 is received from each location. In one arrangement, the conference server application 112 can keep one input audio transducer at each location unmuted, while muting the other input audio transducers by sending the mute indicators 180 to the respective client devices 120-126. The conference server application 112 can select the input audio transducer at each location that is to remain unmuted based on determining which audio waveform data 170-176 indicates the highest signal amplitudes and/or SNR, the level of noise present in the audio waveform data 170-176, etc. As noted, the conference server application 112 can continually monitor the audio waveform data 170-176, and mute/unmute various input audio transducers, in real time, as previously described in order to receive audio data 150-156 from a client device 120-126 presently generating the best audio data 150-156. In another aspect, the conference server application 112 can be configured to keep an input audio transducer of particular client devices 120-126 unmuted, for example input audio transducers of client devices 120-126 used by primary users (e.g., primary presenters), input audio transducers of telephones or other client devices installed in the respective locations, etc.

In another arrangement, the conference server application 112 can keep more than one input audio transducer unmuted at each of one or more of the locations. Doing so can serve to mitigate gaps in input audio transducer coverage. For example, assume that the client devices 120-126 each are located in the same location, and one or more other client devices are located at one or more other locations. The client devices 120-126 may be positioned in different places at the location, for example around a large conference room table. A user (i.e., person) may be walking around the conference room while speaking in the conference. By keeping at least two input audio transducers unmuted, for example two input audio transducers detecting the strongest audio signals (e.g., generating the highest amplitude audio signals and/or providing the highest SNRs), audio data 150-156 generated from the unmuted input audio transducers can ensure that the user's spoken utterances are continually detected without gaps in the merged audio data 160. As the person moves about the room, one or more input audio transducers toward which the user is walking can be unmuted, while one or more input audio transducers away from which the user is walking can be muted. The input audio transducers toward which the user is walking can be input audio transducers from which the generated audio waveform data 170-176 is trending to higher signal amplitude and/or SNR. The input audio transducers from which the user is walking away can be input audio transducers from which the generated audio waveform data 170-176 is trending to lower signal amplitude and/or SNR.

Further, in the case that two or more input audio transducers are unmuted at the location, the conference server application 112 can assigned weighting parameters to the audio data 150-156 generated from audio signals detected by the input audio transducers, with each audio data 150-156 assigned a different weight. For example, the input audio transducer used to generate audio waveform data 170 having the highest signal amplitude and/or SNR can be assigned a first weight, and a input audio transducer used to generate audio waveform data 172 having the next highest signal amplitude and/or SNR can be assigned a second weight, and so on. The conference server application 112 can select amplitudes for the audio signals represented in the audio data 150-156 based on the assigned weighting parameters when generating the merged audio data 160. In illustration, if the input audio transducer of client device 120 is assigned the highest weight and the input audio transducer of the client device 122 is assigned the lowest weight, the conference server application 112 can amplify the audio data 150 to increase the amplitude of the audio signals represented in the audio data 150, and decrease the amplitude of the audio signals represented in the audio data 152. For example, in the merged audio data 160, the amplitude of the audio signals represented in the audio data 150 can be approximately three times higher than the amplitude of the audio signals represented in the audio data 152.

As noted, the conference server application 112 can process the audio waveform data 170-176 in real time and generate audio quality parameters for the respective audio waveform data 170-176. The conference server application 112 can determine an optimal sampling rate for the audio waveform data 170-176 based on the audio quality parameters. For example, if noise parameters for the audio waveform data 170-176 indicate SNRs that are below a first threshold value, the conference server application 112 can communicate a message to one or more of the conference client applications 130-136 to increase the sampling rate used to generate the audio waveform data 170-176. Increasing the sampling rate can increase the resolution of the audio waveform data 170-176, and thus increase the SNR. If, on the other hand, the noise parameters indicate the SNR is above a second threshold value, the conference server application 112 can communicate a message to one or more of the conference client applications 130-136 to decrease the sampling rate used to generate the audio waveform data 170-176. In such case, decreasing the sampling rate can reduce the amount of network bandwidth required to communicate the audio waveform data 170-176.

The conference server application 112 can adjust, periodically or continually in real time, the sampling rate to attempt to keep the SNR for audio waveform data 170-176 generated by at least one client device 120-126 at each location between the first and second threshold values. For example, assume the client devices 120, 122 are located at the same location, and the noise parameters for audio waveform data 170-172 both indicate that SNR is below the first threshold value. The conference server application 112 can communicate messages to the conference client applications 130-132 to increase incrementally the sampling rate used to generate the audio waveform data 170-172 until the conference server application 112 determines the SNR of at least one of the audio waveform data 170-172 is above the threshold value. If the noise parameters for audio waveform data 170-172 both indicate that SNR is above the second threshold value, the conference server application 112 can communicate messages to the conference client applications 130-132 to decrease incrementally the sampling rate used to generate the audio waveform data 170-172 until the conference server application 112 determines the SNR of both of the audio waveform data 170-172 is below the threshold value.

In a further aspect of the present arrangements, the conference server application 112 can initiate, in real time, the client devices 120-126 to mute and unmute their respective output audio transducers (e.g., loudspeakers). For example, the mute indicators 180 also can initiate the client devices 120-126 to mute/unmute their respective output audio transducers. In illustration, in addition to muting flags for muting/unmuting input audio transducers (first muting flags), the conference server application 112 can implement second muting flags contained within headers of the TCP packets. Each second muting flag can be set to mute (e.g., set to 1) a respective output audio transducer or set to unmute (e.g., set to 0) a respective output audio transducer.

In another arrangement, the conference server application 112 can communicate to the client devices 120-126, which are to mute their respective input audio transducers, messages including the mute indicators 180. The respective conference client applications 130-136 can mute and unmute their respective output audio transducers in accordance with the mute indicators 180 they receive. In this regard, each message the conference server application 112 communicates to a respective client device 120-126 can include at least two mute indicators 180. A first mute indicator 180 can indicate to the respective client device 120-126 to mute or unmute an input audio transducer, and a second mute indicator 180 can indicate to the respective client device 120-126 to mute or unmute an output audio transducer.

To determine which client devices 120-126 are to mute their respective output audio transducers, the conference server application 112 can assign to each output audio transducer (or each client device 120-126) an output audio transducer weighting parameter. The conference server application 112 can exclude, from a list of client devices 120-126 that are to mute their respective output audio transducers, the client device(s) 120-126 communicating audio signals to the output audio transducer assigned a highest weight(s). The conference server application 112 can determine the respective output audio transducer weighting parameters in any suitable manner.

For example, the conference client application 130-134 of each client device 120-126 can communicate to the conference server application 112 a message indicating a brand and model of one or more output audio transducers contained in, or communicatively linked to, the client device 120-126. The conference server application 112 can access a data table containing identification data for various brands and models of output audio transducers and, for each brand/model, a respective weighting parameter.

In another example, a user of the client device 120 can, via a conference client application 130, access a menu pertaining to output audio transducer muting options. The conference client application 130 can communicate with the conference server application 112 to determine which other client devices 122-126 participating in the conference are co-located in the same location with the client device 120. The conference client application 130 can present a listing including the client device 120 and the other client devices 122-126 co-located with the client device 120. From the menu, the user can select which client devices 120-126 are to mute their output audio transducers. In response to the user selection(s), the conference client application 130 can communicate a message to the conference server application 112 indicating which client devices 120-126 are to mute their output audio transducers. Responsive to receiving the message, the conference server application 112 indicating can generate the mute indicators 180 pertaining to muting/unmuting output audio transducers.

In another example, via the conference client applications 130-136, each user can access a menu in which each user can selectively mute or unmute the output audio transducers of their respective client devices 120-126. In response, each conference client applications 130-136 can mute/unmute the respective output audio transducers, and communicate a respective message to the conference server application 112 indicating the mute/unmute status. The conference server application 112 can maintain data, for example in a data table, indicating when output audio transducers of the respective client devices 120-126 are muted or unmuted. Based on such data, the conference server application 112 can learn which client devices 120-126 typically mute or unmute their respective output audio transducers. The conference server application 112 can, based on such learning, apply such learning to determine which client devices 120-126 are to mute their respective output audio transducers.

In an arrangement in which a plurality of output audio transducers are unmuted in a particular location, there may be time differences between when the respective output audio transducers generate output audio signals from the merged audio data 160. The time differences can be due to various latencies in the communication network(s) 140 and/or the client devices 120-126 themselves. Such time differences in audio reproduction can be irritating to users participating in the conference. Nonetheless, the conference server application 112 can implement processes to mitigate the time differences.

For example, in some cases echo cancellation may not completely eliminate audio signals generated by the output audio transducers from being captured in the audio waveform data 170-176. The conference server application 112 can compare such audio signals in the audio waveform data 170-176 and, based on such comparison, determine the time differences. Further, the conference server application 112 can selectively delay communication of the merged audio data 160 to certain client devices 120-126 by an amount of time corresponding to the detected time differences. In illustration, if the output audio transducer of the client device 120 outputs the audio signals from the merged audio data 160 50 ms after the client device 122 outputs the audio signals, the conference server application 112 can delay communication of the merged audio data 160 to the client device 122 by 50 ms in comparison to when the merged audio data 160 is communicated to the client device 120. This can time align the audio signals output by the respective output audio transducers, thus mitigating distortions in the output audio signals caused by time delays.

Figure 3:
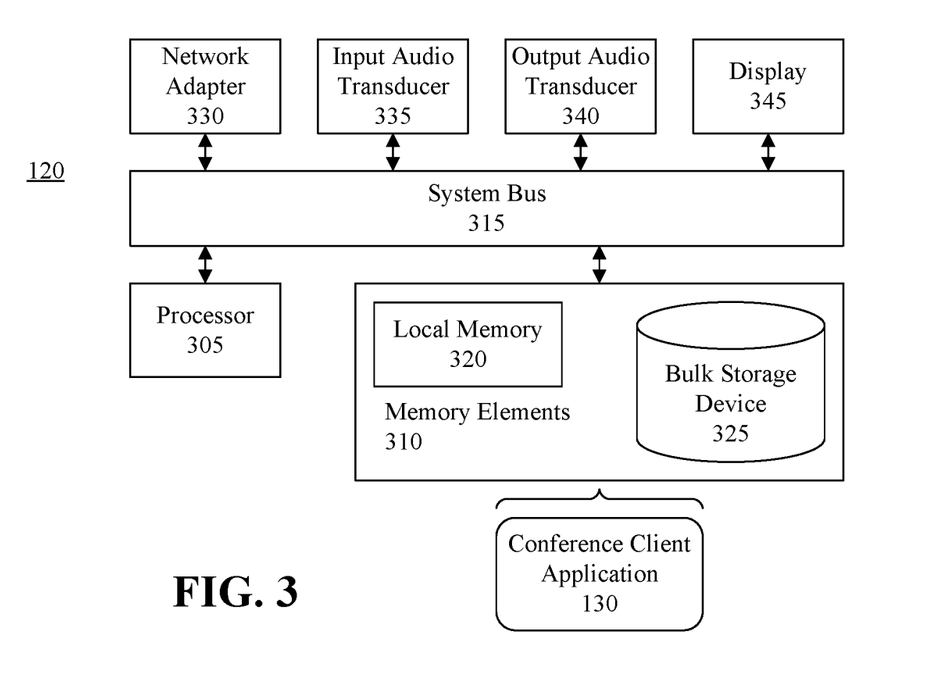
FIG. 3 is a block diagram illustrating example architecture for a client device.

FIG. 3 is a block diagram illustrating example architecture for the client device 120 of FIG. 1. The client devices 122-126 of FIG. 1 can be configured in a similar manner. The client device 120 can include at least one processor 305 (e.g., a central processing unit) coupled to memory elements 310 through a system bus 315 or other suitable circuitry. As such, the client device 120 can store program code within the memory elements 310. The processor 305 can execute the program code accessed from the memory elements 310 via the system bus 315. It should be appreciated that the client device 120 can be implemented in the form of any system including a processor and memory that is capable of performing the functions and/or operations described within this specification as being performed by the client device 120.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The client device 120 also can include one or more cache memories (not shown) that provide temporary storage of at least some program code in order to reduce the number of times program code must be retrieved from the bulk storage device 325 during execution.

One or more network adapters 330 can be coupled to client device 120 to enable the client device 120 to become coupled to other systems, computer systems, remote printers, and/or remote storage devices through intervening private or public networks. Wireless transceivers, modems, cable modems, and Ethernet cards are examples of different types of network adapters 330 that can be used with the client device 120. Input/output (I/O) devices such as an input audio transducer (e.g., microphone) 335, an output audio transducer (e.g., loudspeaker) 340 and, optionally, a display 345 can be coupled to the client device 120. The I/O devices can be coupled to the client device 120 either directly or through intervening I/O controllers. For example, an I/O controller to which the input audio transducer 335 is coupled can implement analog-to-digital (A/D) conversion to convert input audio signals detected by the input audio transducer 335 to a digital format. An I/O controller to which the output audio transducer 340 is coupled can implement digital-to-analog (D/A) conversion and amplification to convert output audio signals from a digital format to analog format, amplify the resulting analog signals, and communicate the analog signals to the output audio transducer 340. The display 345 can be coupled to the client device 120 via a graphics processing unit (GPU), which may be a component of the processor 305 or a discrete device.

As pictured in FIG. 3, the memory elements 310 can store the components of the client device 120, namely the conference client application 130. Being implemented in the form of executable program code, the conference client application 130 can be executed by the processor 305 of the client device 120 and, as such, can be considered part of the client device 120. Moreover, the conference client application 130 is functional data structure that imparts functionality when employed as part of the client device 120.

Figure 4:
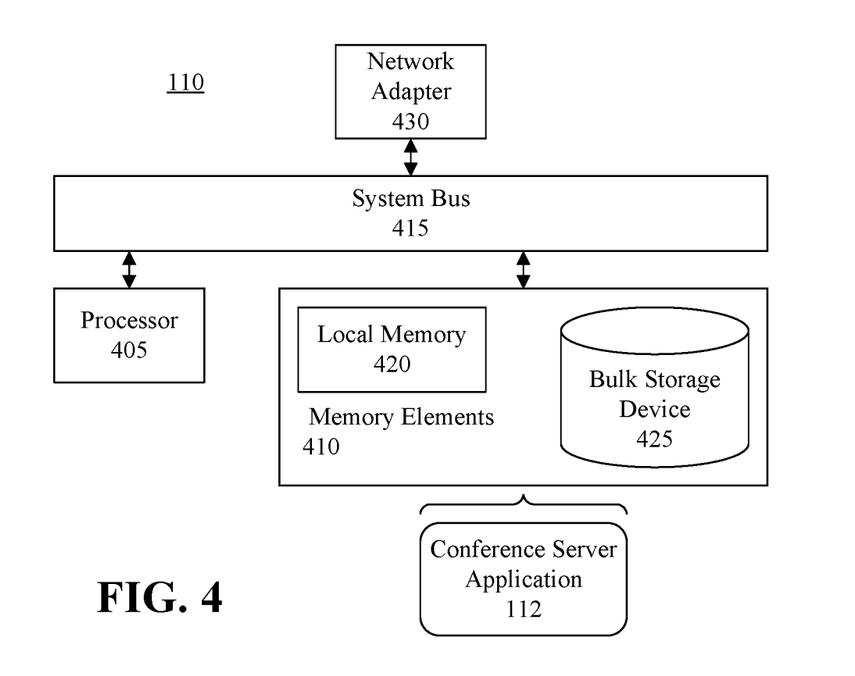
FIG. 4 is a block diagram illustrating example architecture for a conference server.

FIG. 4 is a block diagram illustrating example architecture for the conference server 110 of FIG. 1. The conference server 110 can include at least one processor 405 (e.g., a central processing unit) coupled to memory elements 410 through a system bus 415 or other suitable circuitry. As such, the conference server 110 can store program code within the memory elements 410. The processor 405 can execute the program code accessed from the memory elements 410 via the system bus 415. It should be appreciated that the conference server 110 can be implemented in the form of any system including a processor and memory that is capable of performing the functions and/or operations described within this specification as being performed by the conference server 110. For example, the conference server 110 can be implemented as a server, a plurality of communicatively linked servers, and so on.

The memory elements 410 can include one or more physical memory devices such as, for example, local memory 420 and one or more bulk storage devices 425. The bulk storage device(s) 425 can be implemented as a hard disk drive (HDD), solid state drive (SSD), or other persistent data storage device. The conference server 110 also can include one or more cache memories (not shown) that provide temporary storage of at least some program code in order to reduce the number of times program code must be retrieved from the bulk storage device 425 during execution.

One or more network adapters 430 can be coupled to conference server 110 to enable the conference server 110 to become coupled to other systems, computer systems, remote printers, and/or remote storage devices through intervening private or public networks. Modems, cable modems, transceivers, and Ethernet cards are examples of different types of network adapters 430 that can be used with the conference server 110.

As pictured in FIG. 4, the memory elements 410 can store the components of the conference server 110, namely the conference server application 112. Being implemented in the form of executable program code, the conference server application 112 can be executed by the processor 405 of the conference server 110 and, as such, can be considered part of the conference server 110. Moreover, the conference server application 112 is functional data structure that imparts functionality when employed as part of the conference server 110.

Figure 5:
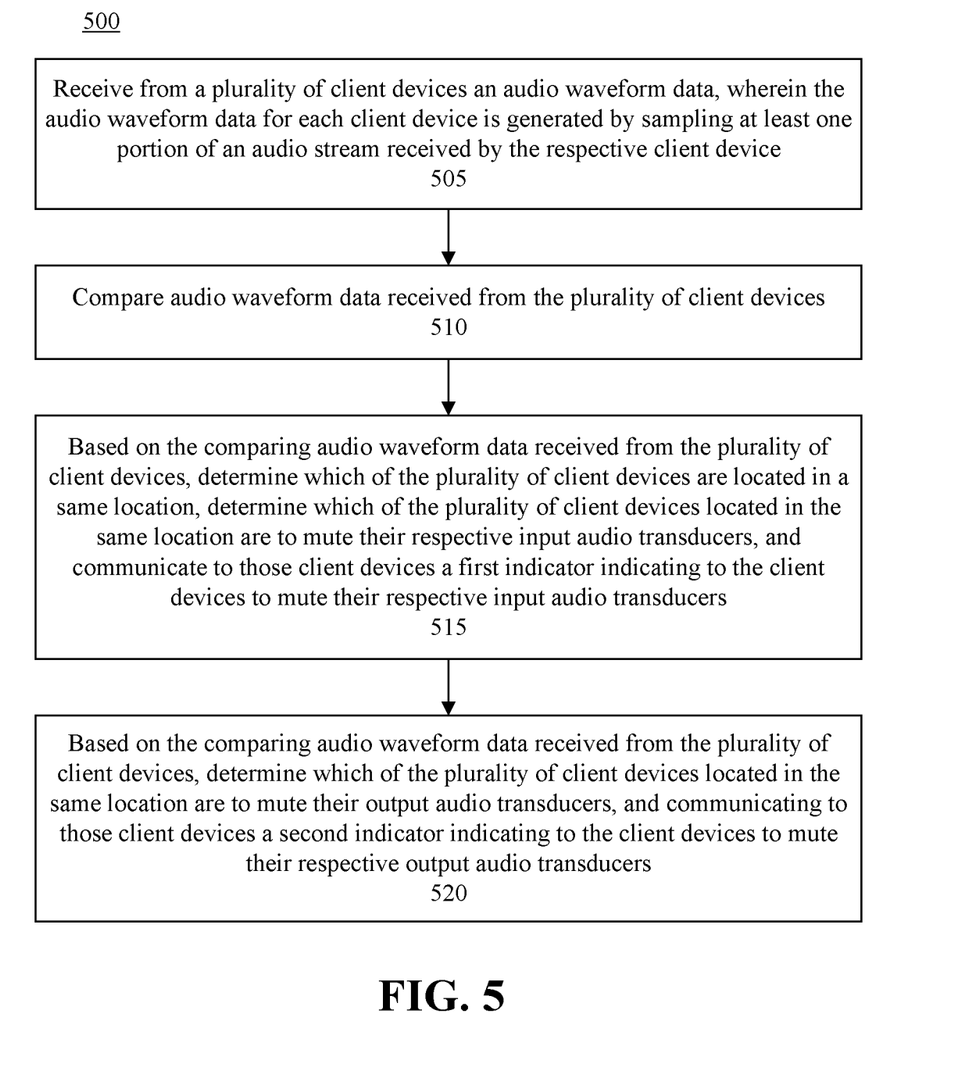
FIG. 5 is a flow chart illustrating an example of a method of selectively initiating client devices to mute their respective input audio transducers.

FIG. 5 is a flow chart illustrating an example of a method 500 of selectively initiating client devices to mute their respective input audio transducers. At step 505, the conference server application 112 can receive from a plurality of client devices an audio waveform data, wherein the audio waveform data for each client device is generated by sampling at least one portion of an audio stream received by the respective client device. At step 510, the conference server application 112 can compare audio waveform data received from the plurality of client devices. At step 515, the conference server application 112 can, based on the comparing audio waveform data received from the plurality of client devices, determine which of the plurality of client devices are located in a same location, determine which of the plurality of client devices located in the same location are to mute their respective input audio transducers, and communicate to those client devices a first indicator indicating to the client devices to mute their respective input audio transducers. At step 520, the conference server application 112 can, based on the comparing audio waveform data received from the plurality of client devices, determine which of the plurality of client devices located in the same location are to mute their output audio transducers, and communicating to those client devices a second indicator indicating to the client devices to mute their respective output audio transducers.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving from a plurality of client devices an audio waveform data, wherein the audio waveform data for each client device is generated by the respective client device sampling at least one portion of an audio stream received by the respective client device at a sampling rate below a threshold level;

comparing audio waveform data received from the plurality of client devices;

based on the comparing audio waveform data received from the plurality of client devices:

determining which of the plurality of client devices are located in a same location;

determining, using a processor, which of the plurality of client devices located in the same location are to mute their respective input audio transducers;

communicating to a first of the plurality of client devices a first indicator set to mute and assigned a time stamp indicating a precise time, the first indicator indicating to the first client device to mute its respective input audio transducer at the precise time; and communicating to a second of the plurality of client devices a second indicator set to unmute and assigned the same time stamp assigned to the first indicator and indicating the precise time, the second indicator indicating to the second client device to unmute its respective input audio transducer at the precise time; and continuing to receive from each of the plurality of client devices the audio waveform data while the input audio transducers are muted with respect to audio data on each of the plurality of client devices that receive a respective indicator indicating to those client devices to mute their respective input audio transducers, and continuing the comparing the audio waveform data received from the plurality of client devices.

2. The method of claim 1, wherein:
the first indicator indicating to the first client device to mute its respective input audio transducer is a flag set in an audio data packet communicated to the first client device; and
the second indicator indicating to the second client device to unmute its respective input audio transducer is a flag set in an audio data packet communicated to the second client device.

3. The method of claim 1, wherein determining which of the plurality of client devices located in the same location are to mute their respective input audio transducers comprises:
determining at least one audio waveform data having a highest signal-to-noise ratio from among audio waveforms generated by the plurality of client devices are located in the same location.

4. The method of claim 1, further comprising:
determining which of the plurality of client devices located in the same location are to mute their output audio transducers, and communicating to those client devices a third indicator indicating to the client devices to mute their respective output audio transducers.

5. The method of claim 4, wherein the third indicator indicating to the client devices to mute their respective output audio transducers is a flag set in an audio data packet communicated to the client devices.

6. The method of claim 4, further comprising:
determining a respective weight assigned to each of the output audio transducers; and
excluding, from a list of the client devices that are to mute their respective output audio transducers, the client device communicating audio signals to the output audio transducer assigned a highest weight.

7. The method of claim 1, wherein the sampling rate at which the respective client device samples the at least one portion of the audio stream received by the respective client device is less than 1,000 Hz.

8. A system, comprising:
a processor programmed to initiate executable operations comprising:
receiving from a plurality of client devices an audio waveform data, wherein the audio waveform data for each client device is generated by the respective client device sampling at least one portion of an audio stream received by the respective client device at a sampling rate below a threshold level;
comparing audio waveform data received from the plurality of client devices;
based on the comparing audio waveform data received from the plurality of client devices:
determining which of the plurality of client devices are located in a same location;
determining, which of the plurality of client devices located in the same location are to mute their respective input audio transducers;
communicating to a first of the plurality of client devices a first indicator set to mute and assigned a time stamp indicating a precise time, the first indicator indicating to the first client device to mute its respective input audio transducer at the precise time; and
communicating to a second of the plurality of client devices a second indicator set to unmute and assigned the same time stamp assigned to the first indicator and indicating the precise time, the second indicator indicating to the second client device to unmute its respective input audio transducer at the precise time; and
continuing to receive from each of the plurality of client devices the audio waveform data while the input audio transducers are muted with respect to audio data on each of the plurality of client devices that receive a respective indicator indicating to those client devices to mute their respective input audio transducers, and continuing the comparing the audio waveform data received from the plurality of client devices.

9. The system of claim 8, wherein:
the first indicator indicating to the first client device to mute its respective input audio transducer is a flag set in an audio data packet communicated to the first client device; and
the second indicator indicating to the second client device to unmute its respective input audio transducer is a flag set in an audio data packet communicated to the second client device.

10. The system of claim 8, wherein determining which of the plurality of client devices located in the same location are to mute their respective input audio transducers comprises:
determining at least one audio waveform data having a highest signal-to-noise ratio from among audio waveforms generated by the plurality of client devices are located in the same location.

11. The system of claim 8, the executable operations further comprising:
determining which of the plurality of client devices located in the same location are to mute their output audio transducers, and communicating to those client devices a third indicator indicating to the client devices to mute their respective output audio transducers.

12. The system of claim 11, wherein the third indicator indicating to the client devices to mute their respective output audio transducers is a flag set in an audio data packet communicated to the client devices.

13. The system of claim 11, the executable operations further comprising:
determining a respective weight assigned to each of the output audio transducers; and
excluding, from a list of the client devices that are to mute their respective output audio transducers, the client device communicating audio signals to the output audio transducer assigned a highest weight.

14. The system of claim 8, wherein the sampling rate at which the respective client device samples the at least one portion of the audio stream received by the respective client device is less than 1,000 Hz.

15. A computer program product comprising a computer readable storage medium having program code stored thereon, the program code executable by a processor to perform a method comprising: receiving, by the processor, from a plurality of client devices an audio waveform data, wherein the audio waveform data for each client device is generated by the respective client device sampling at least one portion of an audio stream received by the respective client device at a sampling rate below a threshold level; comparing, by the processor, audio waveform data received from the plurality of client devices; based on the comparing audio waveform data received from the plurality of client devices: determining, by the processor, which of the plurality of client devices are located in a same location; determining, by the processor, which of the plurality of client devices located in the same location are to mute their respective input audio transducers; communicating to a first of the plurality of client devices a first indicator set to mute and assigned a time stamp indicating a precise time, the first indicator indicating to the first client device to mute its respective input audio transducer at the precise time; and communicating to a second of the plurality of client devices a second indicator set to unmute and assigned the same time stamp assigned to the first indicator and indicating the precise time, the second indicator indicating to the second client device to unmute its respective input audio transducer at the precise time; and continuing to receive from each of the plurality of client devices the audio waveform data while the input audio transducers are muted with respect to audio data on each of the plurality of client devices that receive a respective indicator indicating to those client devices to mute their respective input audio transducers, and continuing the comparing the audio waveform data received from the plurality of client devices.

16. The computer program product of claim 15, wherein: the first indicator indicating to the first client device to mute its respective input audio transducer is a flag set in an audio data packet communicated to the first client device; and the second indicator indicating to the second client device to unmute its respective input audio transducer is a flag set in an audio data packet communicated to the second client device.

17. The computer program product of claim 15, wherein determining which of the plurality of client devices located in the same location are to mute their respective input audio transducers comprises: determining at least one audio waveform data having a highest signal-to-noise ratio from among audio waveforms generated by the plurality of client devices are located in the same location.

18. The computer program product of claim 15, the method further comprising: determining which of the plurality of client devices located in the same location are to mute their output audio transducers, and communicating to those client devices a third indicator indicating to the client devices to mute their respective output audio transducers.

19. The computer program product of claim 18, wherein the third indicator indicating to the client devices to mute their respective output audio transducers is a flag set in an audio data packet communicated to the client devices.

20. The computer program product of claim 18, the method further comprising: determining a respective weight assigned to each of the output audio transducers; and excluding, from a list of the client devices that are to mute their respective output audio transducers, the client device communicating audio signals to the output audio transducer assigned a highest weight.

* * * * *